(12) United States Patent
Giammaressi

(10) Patent No.: US 7,086,077 B2
(45) Date of Patent: Aug. 1, 2006

(54) SERVICE RATE CHANGE METHOD AND APPARATUS

(75) Inventor: Tom Giammaressi, Union City, CA (US)

(73) Assignee: Sedna Patent Services, LLC, Philadelphia, PA (US)

(*) Notice: Subject to any disclaimer, the term of this patent is extended or adjusted under 35 U.S.C. 154(b) by 524 days.

(21) Appl. No.: 09/406,353

(22) Filed: Sep. 28, 1999

(65) Prior Publication Data

US 2003/0061619 A1 Mar. 27, 2003

Related U.S. Application Data

(60) Provisional application No. 60/127,335, filed on Apr. 1, 1999.

(51) Int. Cl.
H04N 7/173 (2006.01)

(52) U.S. Cl. ..................................................... 725/95

(58) Field of Classification Search ............ 375/240.1, 375/240.02, 240.08, 240.24, 240.25, 240.26; 725/87, 95, 105; 348/425.1, 425.3, 420.1, 348/438, 393, 394, 395; 382/162, 164, 165, 382/236
See application file for complete search history.

(56) References Cited

U.S. PATENT DOCUMENTS

| | | | | |
|---|---|---|---|---|
| 5,115,309 A | * | 5/1992 | Hang .......................... 348/388.1 |
| 5,671,377 A | | 9/1997 | Bleidt et al. ................ 395/328 |
| 5,687,167 A | * | 11/1997 | Bertin et al. ................ 370/406 |
| 5,742,594 A | | 4/1998 | Natarajan .................... 370/336 |
| 5,822,530 A | * | 10/1998 | Brown ......................... 725/96 |
| 6,141,682 A | * | 10/2000 | Barker ......................... 709/217 |
| 6,166,730 A | * | 12/2000 | Goode et al. ................ 345/716 |
| 6,253,375 B1 | * | 6/2001 | Gordon et al. ................ 725/88 |
| 6,272,150 B1 | * | 8/2001 | Hrastar et al. .............. 370/486 |
| 6,282,207 B1 | * | 8/2001 | Lerman et al. ............. 370/470 |
| 6,292,834 B1 | * | 9/2001 | Ravi et al. ................... 709/233 |
| 6,298,071 B1 | * | 10/2001 | Taylor et al. ................ 370/486 |
| 2002/0100059 A | * | 1/2001 | Buehl et al. ................ 725/116 |
| 2001/0055302 A1 | * | 12/2001 | Taylor et al. ................ 370/386 |

OTHER PUBLICATIONS

Bernd Girod, Niko Farber and Uwe Horn, Scalable Codec Architectures for Internet Video-on-Demand.*
Niko Farber and Bernad Girod, Robust H.263 Compatible Video Transmission for Mobile Access to Video Servers, 1997, IEEE, 73-76.*

* cited by examiner

Primary Examiner—Vu Le
Assistant Examiner—Behrooz Senfi
(74) Attorney, Agent, or Firm—Patterson & Sheridan, LLP

(57) ABSTRACT

A method and apparatus for allocating bandwidth within a bandwidth constrained interactive information distribution system. The system determined if a requested information stream may be provided to a requesting subscriber at an appropriate bandwidth level (i.e., appropriate bitrate providing full quality), a minimal bandwidth level (i.e., a reduced bitrate providing minimally acceptable quality) or not at all. Each information stream and any ancillary streams may be stored twice by the system, once at an appropriate encoded bitrate and once at a minimal encoded bitrate.

13 Claims, 2 Drawing Sheets

SERVICE RATE CHANGE METHOD AND APPARATUS

CROSS REFERENCE TO RELATED APPLICATIONS

This application claims benefit of U.S. Provisional Patent Application Ser. No. 60/127,335, which was filed on Apr. 1, 1999 and is incorporated herein by reference in its entirety.

BACKGROUND OF THE INVENTION

1. Field of the Invention

The present invention relates to an information distribution system such as a video-on-demand (VOD) system. More particularly, the present invention relates to a method and apparatus for adapting at least a service level in response an amount of bandwidth available within the information distribution system.

2. Description of the Background Art

In an information distribution system, such as video on demand (VOD) system, an information provider (e.g., a head-end in a cable television system) must control of the distribution of requested information to ensure that requests for information, such as video information, are satisfied in an orderly manner.

Unfortunately, in an information distribution system serving a large number of subscribers, the bandwidth of the various components forming the information distribution system may, at times, be insufficient to satisfy each subscriber request. Present information distribution systems, such as VOD systems, respond to bandwidth constraints by denying subscriber information requests or providing the requested information in a substantially degraded manner. In a VOD system, this degradation may take the form of poor temporal alignment between video and audio tracks (i.e., poor "lip-sync"), missing information due to "dropped" video or audio frames and/or excessive latency in responding to subscriber interactions. These and other qualitative degradations are common in present systems.

Therefore, it is seen to be desirable to provide a method and apparatus for ensuring that a bandwidth constrained system provides information having at least a minimal qualitative level. Moreover, it is seen to be desirable to provide such functionality within the context of a video on demand system.

SUMMARY OF THE INVENTION

The disadvantages heretofore associated with the prior art are overcome by the present invention of a method and apparatus for allocating bandwidth within a bandwidth constrained interactive information distribution system. The system determines if a requested information stream may be provided to a requesting subscriber at an appropriate bandwidth level (i.e., appropriate bitrate providing full quality), a minimal bandwidth level (i.e., a reduced bitrate providing minimally acceptable quality) or not at all. Each information stream and any ancillary streams may be stored twice by the system, once at an appropriate encoded bitrate and once at a minimal encoded bitrate.

Specifically, in an information distribution system comprising provider equipment and subscriber equipment, said provider equipment providing information to said subscriber equipment via a forward channel, said subscriber equipment requesting said information via a back channel, a method according to the invention comprises the steps of: determining whether the information distribution system has sufficient bandwidth available to provide information requested by a subscriber; providing, in the event of appropriate bandwidth availability, said requested information to the subscriber using said appropriate bandwidth; and providing, in the event of minimum bandwidth availability, said requested information to the subscriber using the minimum bandwidth.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention will be primarily described within the context of a video on demand (VOD) systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference. It will be appreciated by those skilled in the art that the teachings of the present invention may be advantageously applied to other information distribution systems where components or functional elements within the system are bandwidth constrained.

Figure 1:
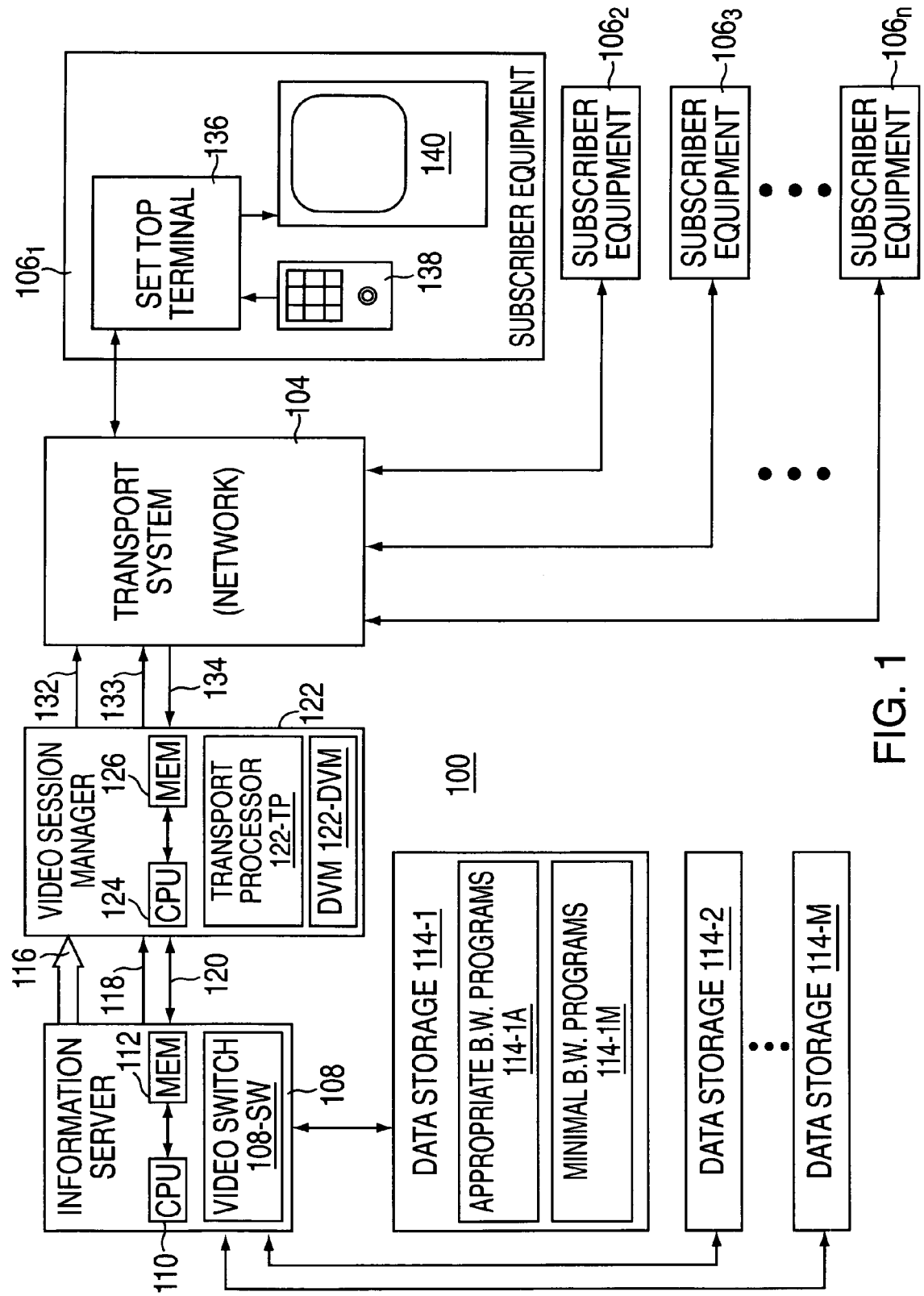
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment $106_n$, where n is an integer greater than zero.

The service provider equipment 102 contains an information server 108 which is typically a parallel processing computer containing at least one central processing unit 110 and associated memory 112. The server interacts with at least one data storage device 114-1 (e.g., a disk drive array) that generally stores the subscriber information (e.g., video data) that will be recalled and downloaded to the subscriber. Optionally, a plurality of data storage devices 114-2 through 114-M, where M is an integer, may interact with the information server 108. Additionally, within the service provider equipment is a video session manager 122 that provides session control of the information flowing to and from the server. Furthermore, the video session manager 122 contains its own central processing unit 124 and associated memory 126. The video session manager 122 (or session manager) is a system providing communications between the provider equipment 102 (e.g., a cable system head end) and one or more set top terminals. The session manager 122 also manages the server content streams transmitted to the one or more set top terminals.

The information server 108 is coupled to the video session manager via data path 116, synchronization clock path 118 and control path 120. The information server 108 provides data streams on data path 116 and a synchronization clock on path 118 in response to requests for information from the video session manager on path 120. The data streams are retrieved from the data storage device 114-1.

The information server 108 includes a video switch 108-SW that is used to multiplex information to be provided via data path 116. In the case of a single data storage unit 114-1, the video switch 108-SW is used to multiplex data retrieved from the single data storage unit 114-1 and any data locally stored (e.g., cache or other storage device) within the information server 108. In the case of multiple data storage units 114-2-114-M, the video switch 108-SW is used to additionally multiplex data retrieved from these units. Thus, the video switch 108-SW is used to couple video information to each user on a round robin basis by inserting within the data stream 116 one video extent (or other storage quantum) for each user or subscriber receiving such information.

The video switch 108-SW has associated with it a maximum bandwidth utilization parameter indicative of a maximum data processing rate. Attempts to operate the video switch 108-SW beyond the maximum data processing rate will cause improper switching, resulting in dropped packets or missing data and other improper operation. In the case of video information, such improper operation will likely result in the presentation of objectionable visual or audio artifacts to a set top terminal requesting the video information.

It is important to note that the data path 116 is capable of providing data up to a maximum bit rate. Thus, the information server 108 is bandwidth constrained by at least the data processing rate of the video switch 108-SW and by the bandwidth of the data path 116. Moreover, other data paths within the system, such as the data path between the data storage unit 114-1 and the information server 108 are also subject to respective maximum data rates. Similarly, other data processing elements within the system, such as memory read and write circuitry (not shown) within the data storage unit 114-1, are also subject to respective maximum data processing and/or delivery rates.

Referring to FIG. 1, the data storage unit 114-1 is depicted as storing appropriate bandwidth programs 114-1A and minimal bandwidth programs 114-1M. Appropriate bandwidth programs 114-1A comprise those programs, such as audio-visual programs, than have been encoded utilizing a bit budget that is appropriate to the program in terms of visual or aural encoding quality. For example, a high definition program that has been encoded to provide sufficient information such that a high quality presentation of the high definition program may be provided via the subscriber equipment. By contrast, minimal bandwidth programs 114-1M comprise those programs, such as audio-visual programs, than have been encoded utilizing a bit budget representing a minimal level in terms of visual or aural encoding quality. For example, a high definition program that has been encoded to provide sufficient information such that only a standard quality presentation of the high definition program may be provided via the subscriber equipment. It is noted that these programs may include auxiliary program information, such as fast forward (FF) and rewind (REW) tracks. A FF track comprises, effectively, a temporally sub-sampled version of a main program. A REW track comprises, effectively, a reverse-ordered and temporally sub-sampled version of a main program. Such FF and REW tracks are suitable for enabling FF and REW functionality in the information distribution system 100 of FIG. 1. That is, a subscriber may request that a presently presented program be "fast forwarded" or "rewound" to some future or previous point I the program. The server responsively begins streaming the FF or REW track to the subscriber in response to the request.

In one embodiment of the invention, the data storage unit 114-1 stores data for each program across a plurality of magneto optical or hard disk drives using a striping technique described in U.S. Pat. No. 5,671,377 for SYSTEM FOR SUPPLYING STREAMS OF DATA TO MULTIPLE USERS BY DISTRIBUTING A DATA STREAM TO MULTIPLE PROCESSORS AND ENABLING EACH USER TO MANIPULATE SUPPLIED DATA STREAM, issued Sep. 23, 1997, which is incorporated herein by reference in its entirety. In this manner, disk read latency is reduced to provide greater system throughput.

The video session manager 122 accomplishes all of the transmission interface requirements of the system 100. Specifically, the video session manager 122 is coupled to subscriber equipment 106 via a forward information channel 132, a forward command channel 133 and a back channel 134. All three of these channels are supported by the transport subsystem 104.

The video session manager contains a transport processor 122-TP for packetizing the information provided by the information server via data path 116. The video session manager also contains a digital video modulator (DVM) 122-DVM for modulating the server data streams onto one or more carrier frequencies that are compatible with the transmission requirements of the network 104. The output of the digital video modulator 122-DVM is coupled to the forward information channel of the transport subsystem 104. Additionally, the video session manager contains a modem for sending control information via the forward command channel and receiving control information via the back channel.

It is important to note that the transport processor 122-TP and the digital video modulator (DVM) 122-DVM of the video session manager 122 are subject to respective maximum data rates. That is, the bandwidth or maximum data processing or transmission rates of the transport processor 122-TP and the digital video modulator (DVM) 122-DVM operate to limit the amount of data that may be delivered by the system to the subscribers.

Thus, the information processing system 100 of FIG. 1 is bandwidth constrained by the video switch 108-SW, the various data paths such as data path 116 and the forward channel 132, the transport processor 122-TP and the digital video modulator 122-DVM. A present utilization level for each of these systems may e determined empirically or by calculation. For example, in one embodiment of the invention the video switch 108-SW, the transport processor 122-TP and the digital video modulator 122-DVM indicate respective present utilization levels to the CPU 110 of the information server 108 and, optionally, to the CPU 124 of the session manager 122.

In another embodiment of the invention, the bandwidth utilization levels of the respective bandwidth constraining system components are modeled based upon expected component loading levels. The component loading levels are determined with respect to the type of information requested by subscribers (high definition audio-visual, standard definition audio-visual, still or moving imagery, various audio formats and other data, such as internet web pages and block file transfers). By modeling the bandwidth requirements of data requested by each subscriber within the system and aggregating this information the system is able to control the bandwidth utilization levels such that information degradations can be managed in an orderly fashion. This will be explained in more detail below with respect to FIG. 2.

The transport subsystem 104 can include any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

Referring now to the subscriber equipment 106, each set top terminal 136 receives the data streams from the forward information channel 132, demodulates those streams and processes them for display on the display device 140 (e.g., a conventional television). In addition, the set top terminal 136 accepts commands from a remote control input device 138 or other input device. These commands are formatted, compressed, modulated, and transmitted through the network 104 to the video session manager 122. Typically, this transmission is accomplished through the back channel 134. These commands are preferably transmitted through the same network used to transmit information to the set top terminal. However, the back channel coupling the set top terminal to the server may be a separate network, e.g., a forward information channel through a television cable network and a back channel through a telephone network. The telephone network could also support the forward control channel. The video session manager 122 interprets each command sent from the set top terminal through the back channel and instructs the information server to perform certain functions to implement the subscriber request.

Figure 2:
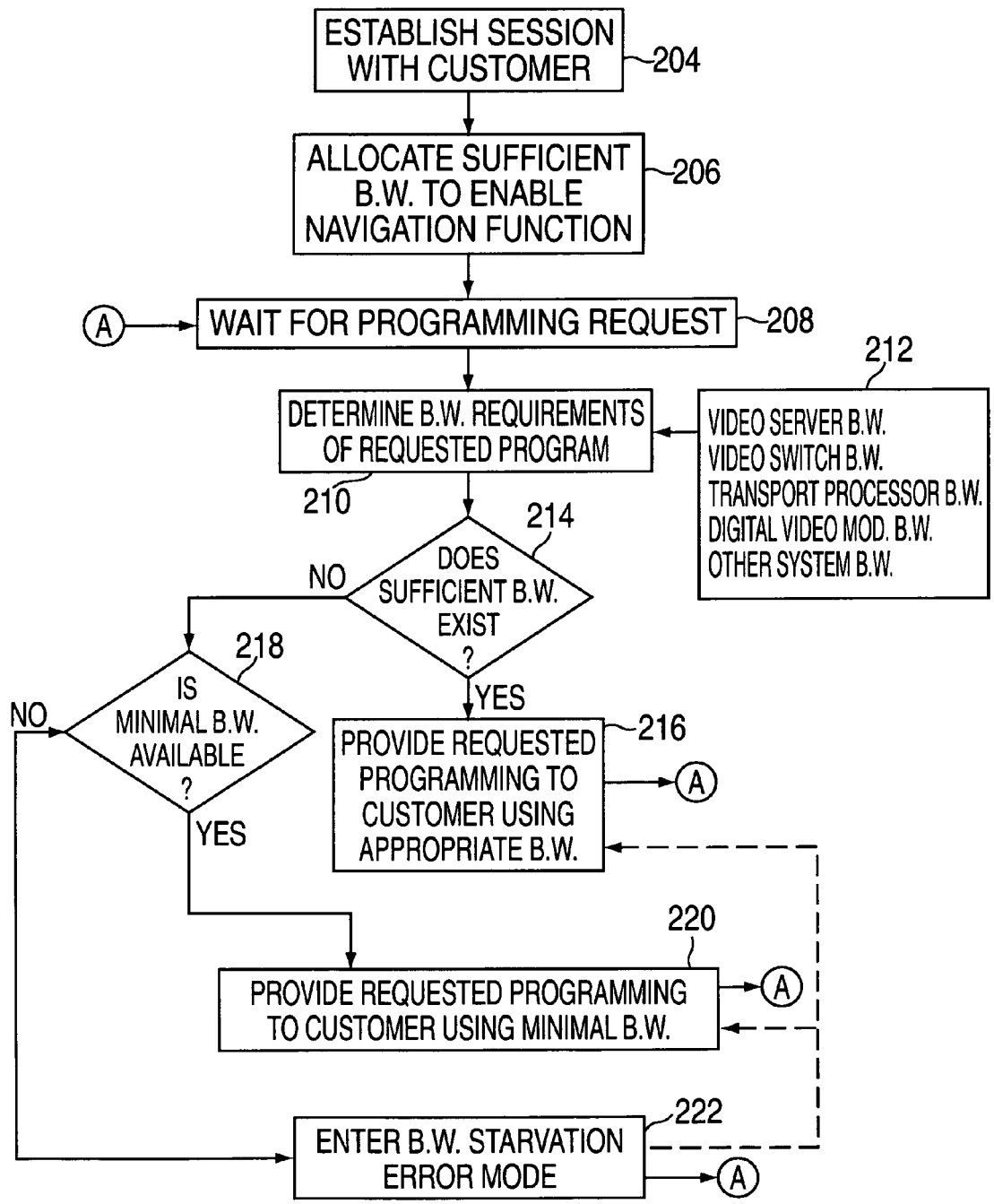
FIG. 2 depicts a flow diagram of a method for allocating bandwidth suitable for use in the information distribution system of FIG. 1.

FIG. 2 depicts a flow diagram of a method for allocating bandwidth suitable for use in the information distribution system of FIG. 1. Specifically, the method 200 of FIG. 2 provides bandwidth management functionality on an individualized basis to each of a plurality of subscribers requesting video and other information from the information distribution system 100. The method adapts various parameters of the provided video or other information based upon the processing, transmission and memory bandwidth available to the system 100 at the time the video or other information is requested.

The method 200 begins at step 204, where a session is established with a customer or subscriber. That is, at step 204 the video session manager 122 of the system 100 establishes a session with a subscriber or customer. For example, the subscriber equipment interacts with the provider equipment such that a particular physical channel and logical channel is assigned to the subscriber. The subscriber then utilizes information received via the assigned channel to begin presenting, e.g., a program navigation display screen or other welcome display screen.

At step 206 bandwidth sufficient to enable a navigation function is allocated to the subscriber or customer of step 204. For example, a suitable navigation function is described in U.S. Pat. No. 6,208,335 entitled METHOD AND APPARATUS FOR PROVIDING A MENU STRUCTURE FOR AN INTERACTIVE INFORMATION DISTRIBUTION SYSTEM and issued on Mar. 27, 2001, which is incorporated herein by reference in its entirety. The disclosed navigation function provides an interactive means for a subscriber to browse and select for subsequent viewing video information within a video and demand system. For purposes of this disclosure it is assumed that such a navigation function requires a bandwidth of approximately 3.3 million bits per second (Mbps). Thus, at step 206, 3.3 Mbps of bandwidth is reserved for the customer or subscriber of step 204.

At step 208 the method 200 waits for a programming request from the subscriber. Upon receiving a program request, the method 200 proceeds to step 210 where the bandwidth required to provide the requested programming is determined. That is, a determination is made as to the amount of bandwidth required, from each of at least one bandwidth constrained resource, to process the request. This determination also considers the existing load placed upon the at least one bandwidth constrained resource due to other requests presently being satisfied by the information provider. As noted with respect to box 212, the bandwidth determination is made with respect to bandwidth requirements for at least one of video server resources (114-1, 108), video switch resources (108-SW), transport processor resources (122-TP), digital video modulator resources (122-DVM) and other system resources.

At step 214 a query is made at to whether sufficient bandwidth exists to satisfy the programming requests. If the query at step 214 is answered affirmatively, then the method 200 proceeds to step 216 where the requested programming is provided to the customer or subscriber using the bandwidth appropriate to the requested programming. For example, in the case of the requested programming comprising a high definition program having an appropriate bandwidth of 9 Mbps from one or more of the various resources noted in box 212, and such bandwidth being available, the requested program is retrieved from the appropriate bandwidth programs 114-1A portion of the data storage unit 114-1 and provided to the subscriber. The method 200 then proceeds to step 208 to await the next programming request from the customer.

If the query at step 214 is answered negatively, then the method 200 proceeds to step 218 where a query is made as to whether a minimum amount of bandwidth is available. That is, a query is made as to whether an amount of bandwidth sufficient to provide a minimum level of quality for the requested program is available (e.g., encoded to provide at least a minimum quality level). For example, in the case of the requested programming comprising a high definition program having an appropriate bandwidth of 9 Mbps from one or more of the various resources noted in box 212, and only a minimum bandwidth of 5 Mbps being available, the requested program is retrieved from the minimum bandwidth programs 114-1M portion of the data storage unit 114-1 and provided to the subscriber. The method 200 then proceeds to step 208 to await the next programming request from the customer.

If the query at step 218 is answered negatively, then the method 200 proceeds to step 222 where the system enters a bandwidth starvation mode (i.e., an error mode). In the bandwidth starvation mode the requested program may be provided using the available bandwidth, regardless of quality degradation, as is presently done in known video on demand systems. However, providing requested content using such insufficient bandwidth will likely result in a very poor quality presentation to at least the subscriber. Thus, rather than providing a severely degraded program to a subscriber (one likely to annoy the subscriber), in the absence of even the minimal amount of bandwidth it is preferred that the subscriber be denied access to the requested programming after a predetermined time period waiting for sufficient bandwidth to become available. It should be noted that in a system 100 of FIG. 1 a large number of subscribers or consumers are serviced and the bandwidth utilization levels fluctuate greatly even a brief period of time. Thus, in the case of a minimal or sufficient level of bandwidth becoming available, the requested program is provided to the customer using respectively a minimal bandwidth level or an appropriate bandwidth level. The method then proceeds to step 208 to await the programming request from the subscriber.

The above-described invention provides an efficient mechanism for ensuring that subscribers receive requested information conforming to at least a minimal level of quality while managing the bandwidth constrains within an information distribution system.

It is important to note that the above-described service rate change or bandwidth allocation/re-allocation made in response to the bandwidth requirements associated with satisfying a user or subscriber request occurs during an open session. That is, the session opened between the subscriber and the server at, e.g., step 204 of the method 200 of FIG. 2, provides multiple bandwidth or service rate allocations (as necessary) in response to subscriber requests. This dynamic adaptation of bandwidth provides advantageously reduces the transaction costs (e.g., apparent latency to the requesting subscriber, control channel utilization, server processing and the like) involved with establishing new sessions each time service rate change is appropriate.

In one embodiment of the invention, the service level provided to a subscriber is changed during the session established with the subscriber. That is, programming or content requiring different bandwidths is provided to the subscriber by dynamically re-allocating bandwidth as necessary during the session in response to, for example, requests for new or different content. For example, a user may initially receive 3 megabit per second menuing video (e.g., a navigator), then switch to a 9 megabit per second high definition television program or a 200 kilobit per second audio program. The system dynamically allocates bandwidth to accommodate these requests.

Although various embodiments which incorporate the teachings of the present invention have been shown and described in detail herein, those skilled in the art can readily devise many other varied embodiments that still incorporate these teachings.

What is claimed is:

1. In an video-on-demand (VOD) distribution system comprising provider equipment and subscriber equipment, said provider equipment providing VOD content to said subscriber equipment via a forward channel, said subscriber equipment requesting said information via a back channel, provider equipment apparatus comprising:
   a session manager, for receiving VOD content requests from said subscriber equipment and determining, for each received request, whether said VOD distribution system has sufficient bandwidth available to provide the requested VOD content; and an information server, coupled to said session manager, for providing said requested VOD content using stored content encoded in a manner adapted to utilize an appropriate bandwidth in the case of appropriate bandwidth availability, and for providing said requested VOD content using stored content encoded in a manner adapted to utilize a minimal bandwidth in the case of at least minimal bandwidth availability, wherein:
   said session manager, in response to a determination that less than a minimum bandwidth is available, waiting for a predetermined period of time and determining, for each received VOD content request not being fulfilled, whether said VOD distribution system has sufficient bandwidth available to provide the requested VOD content.

2. The apparatus of claim 1, wherein:
   said session manager, in response to a final determination that less than a minimum bandwidth is available, denying access to said VOD content to said requesting subscriber.

3. In an video-on-demand (VOD) distribution system comprising provider equipment and subscriber equipment, said provider equipment providing VOD content to said subscriber equipment via a forward channel, said subscriber equipment requesting said information via a back channel, provider equipment apparatus comprising:
   a session manager, for receiving VOD content requests from said subscriber equipment and determining, for each received request, whether said VOD distribution system has sufficient bandwidth available to provide the requested VOD content; and an information server, coupled to said session manager, for providing said requested VOD content using stored content encoded in a manner adapted to utilize an appropriate bandwidth in the case of appropriate bandwidth availability, and for providing said requested VOD content using stored content encoded in a manner adapted to utilize a minimal bandwidth in the case of at least minimal bandwidth availability, further comprising:
   a transport processor, for packetizing information provided by said information server;
   said session manager determining said VOD distribution system bandwidth with respect to at least a bandwidth utilization level of said transport processor.

4. In an video-on-demand (VOD) distribution system comprising provider equipment and subscriber equipment, said provider equipment providing VOD content to said subscriber equipment via a forward channel, said subscriber equipment requesting said information via a back channel, provider equipment apparatus comprising:
   a session manager, for receiving VOD content requests from said subscriber equipment and determining, for each received request, whether said VOD distribution system has sufficient bandwidth available to provide the requested VOD content; and an information server, coupled to said session manager, for providing said requested VOD content using stored content encoded in a manner adapted to utilize an appropriate bandwidth in the case of appropriate bandwidth availability, and for providing said requested VOD content using stored content encoded in a manner adopted to utilize a minimal bandwidth in the case of at least minimal bandwidth availability, further comprising:
   a plurality of data storage devices, coupled to said information server via a video switch;
   said session manager determining said VOD distribution system bandwidth with respect to at least one a bandwidth utilization level of said video switch and a bandwidth utilization level of a storage devices including said requested information.

5. The apparatus of claim 1, further comprising:
a digital video modulator, for modulating packetized information streams onto a carrier;
said session manager determining said VOD distribution system bandwidth with respect to a bandwidth utilization level of said digital video modulator.

6. The apparatus of claim 1, wherein a first level of bandwidth is allocated to each subscriber upon establishing a session, said first level of bandwidth being sufficient to support a navigation function.

7. The apparatus of claim 1, wherein said appropriate bandwidth level represents a bandwidth level sufficient to provide said requested VOD content to said subscriber without qualitatively degrading said requested VOD content, and said minimum bandwidth level represents a bandwidth level sufficient to provide said requested VOD content to said subscriber where said requested VOD content is qualitatively degraded.

8. The apparatus of claim 1, wherein the at least one of a video server bandwidth, a video switch bandwidth, a transport processor bandwidth and a digital video modulator bandwidth are modeled based upon expected component loading levels.

9. The apparatus of claim 8, wherein said component loading levels are determined with respect to the type of information requested.

10. The apparatus of claim 9, wherein said information type comprises one of a video, audio, audiovisual and data type.

11. The apparatus of claim 10, wherein said information types comprise video formats having differing quality levels.

12. The apparatus of claim 9, wherein information requests from each of a plurality of requesting subscribers are used to provide VOD content type data for modeling the component loading levels, said subscriber requests for VOD content being aggregated to control bandwidth utilization levels such that information degradation is managed in an orderly fashion.

13. The apparatus of claim 1, wherein each program to be provided to requesting subscribers is stored at each of an appropriate encoded bitrate and a minimal encoded bitrate.

* * * * *

UNITED STATES PATENT AND TRADEMARK OFFICE
CERTIFICATE OF CORRECTION

PATENT NO. : 7,086,077 B2
APPLICATION NO. : 09/406353
DATED : August 1, 2006
INVENTOR(S) : Tom Giammaressi It is certified that error appears in the above-identified patent and that said Letters Patent is hereby corrected as shown below:

Column 1, line 54, delete "determines" and insert instead --determined--.

Column 8, line 58, delete "adopted" and insert instead --adapted--.

Signed and Sealed this

Fourteenth Day of November, 2006

JON W. DUDAS
*Director of the United States Patent and Trademark Office*